United States Patent
Jung (10) Patent No.: US 7,189,912 B2
(45) Date of Patent: Mar. 13, 2007

(54) METHOD AND APPARATUS FOR TRACKING MUSICAL SCORE

(75) Inventor: Doill Jung, Dongjak-Ku (KR)

(73) Assignee: Amusetec Co., Ltd. (KR)

( * ) Notice: Subject to any disclaimer, the term of this patent is extended or adjusted under 35 U.S.C. 154(b) by 413 days.

(21) Appl. No.: 10/477,042

(22) PCT Filed: May 21, 2002

(86) PCT No.: PCT/KR02/00952

§ 371 (c)(1),
(2), (4) Date: Nov. 7, 2003

(87) PCT Pub. No.: WO02/101338

PCT Pub. Date: Dec. 19, 2002

(65) Prior Publication Data

US 2005/0115382 A1    Jun. 2, 2005

(30) Foreign Application Priority Data

May 21, 2001    (KR) .............................. 2001-27695

(51) Int. Cl.
*G10H 1/36* (2006.01)
(52) U.S. Cl. ...................... 84/610; 84/477 R; 84/483.1
(58) Field of Classification Search .............. 84/477 R, 84/610, 483.1, 634, 470 R
See application file for complete search history.

(56) References Cited

U.S. PATENT DOCUMENTS 5,521,323 A * 5/1996 Paulson et al. ................ 84/610
5,913,259 A * 6/1999 Grubb et al. .................. 84/610
6,107,559 A * 8/2000 Weinstock et al. ............ 84/634
6,156,964 A 12/2000 Sahai et al. ................ 84/470 R
6,166,314 A * 12/2000 Weinstock et al. ......... 84/483.1

(Continued)

FOREIGN PATENT DOCUMENTS

JP    5-27670    2/1993

(Continued)

OTHER PUBLICATIONS

PCT International Search Report; International application No. PCT/KR02/00952; International filing date of : May 21, 2002; Mailing date of: Sep. 17, 2002.

(Continued)

*Primary Examiner*—Lincoln Donovan
*Assistant Examiner*—David S. Warren
(74) *Attorney, Agent, or Firm*—Cantor Colburn LLP (57) ABSTRACT

A score tracking method and apparatus are provided. The method detects frequency models of score notes to be performed, compiles a list of frequency models, and generates a matching model composed of frequency components, based on the list. The frequency components are included in audio data to be generated during a performance of the score notes. The method then receives external audio data during an actual performance of the score notes, converts the audio data into digital signal, and detects current performance frequency data from the digital signal. The method then determines whether the matching model matches the current performance frequency data when the current performance frequency data includes a new frequency component other than the frequency components of the matching model, generates synchronized information between the actual performance of the score notes and the score notes, and updates the matching model.

8 Claims, 11 Drawing Sheets

U.S. PATENT DOCUMENTS 6,380,474 B2 * 4/2002 Taruguchi et al. ............ 84/612

FOREIGN PATENT DOCUMENTS

| JP | 11-153991 | 6/1999 |
| JP | 2000-305560 | 11/2000 |
| JP | 2001-265326 | 9/2001 |
| KR | 2000-0072127 | 12/2000 |

OTHER PUBLICATIONS

PCT International Preliminary Examination Report; International application No. PCT/KR02/00952; International filing date of: May 21, 2002; Date of Completion: Sep. 22, 2003.

* cited by examiner

| NOTE LENGTH | 1/4 | 1/8 | 1/8 | 1/8 | 1/8 |
|---|---|---|---|---|---|
| PITCH | D5 | G4 | A4 | B4 | C5 |
| NOTE LENGTH | 1/2 | | | 1/4 | |
| PITCH | B3 | | | A3 | |
| NOTE LENGTH | 1/2 | | | | |
| PITCH | G3 | | | | |
| | t | 1/2t | 1/2t | 1/2t | 1/2t |
| | A | B | C | D | E |

METHOD AND APPARATUS FOR TRACKING MUSICAL SCORE

TECHNICAL FIELD

The present invention relates to a score tracking method and apparatus for automatically tracking a performance location in a score.

Generally, people use scores when practicing or playing a musical instrument such as a piano or violin. In other words, except a special case such as a test, people refer to a score when practicing or playing music. For example, students refer to what a teacher said that was written down on a score when studying music, and players of a symphony orchestra write down interpretation instructed by a conductor on a score and refer to it when playing.

Usually, players use both hands when playing musical instruments. Accordingly, the players need someone to help to leaf through a score or need to quickly turn a page of a score with one hand by themselves during performance. Therefore, the players cannot be devoted to only performance.

BACKGROUND ART

In order to solve the problem, conventionally, an additional apparatus such as a timer or pedal is installed at a music stand, which is used for holding a score, so that players can leaf through the score without using a hand, or methods for automatically leafing through a score have been proposed. However, according to these methods, it is difficult to appropriately set a time, at which a page of a score is turned, due to difference in performance tempo among players.

In another method, pitch information of monophonic note, which is currently performed, is detected and matched with note on a score so that a time at which a page of the score is turned is determined based on real performance information. However, this method can be applied when only monophonic notes are performed but cannot be applied when polyphonic notes are performed using, for example, a violin, a guitar, and a piano or when a concerto is performed.

DISCLOSURE OF THE INVENTION

To overcome the above problems, it is a first object of the present invention to provide a score tracking method and apparatus for accurately tracking a performance location in a score when polyphonic notes or a concerto as well as monophonic note is performed, by matching frequency models, which are expected from score information, with frequency components of externally input sounds.

It is a second object of the present invention to provide a recording medium for recording control commands for executing the above score tracking method.

It is a third object of the present invention to provide a computer-executable method for automatically tracking a performance location in a score according to the above score tracking method.

To achieve the first object of the present invention, there is provided a score tracking method including a first step of detecting a list of frequency models, which are expected to occur during performance of a score, from score information; a second step of generating a matching model, which is composed of frequency components that are expected to be included in audio data externally input at the time, based on the frequency model list; a third step of receiving external audio data, converting the audio data into digital signal, and detecting current performance frequency data from the digital signal; a fourth step of determining whether a new frequency component is included in the current performance frequency data; a fifth step of determining whether the matching model matches the current performance frequency data when a new frequency component is included in the current performance frequency data; and a sixth step of generating synchronized information between the real performing notes and the score notes and updating the matching model, when it is determined that the matching model matches the current performance frequency data in the fifth step.

There is also provided a score tracking apparatus including a digital signal input unit that receives music performed outside and converts it into digital signal; a frequency analyzer that extracts frequency components from the digital signal; a score information input unit that inputs score information, which comprises pitch and length information of each note included in a score to be performed; a frequency modeling unit that detects frequency models of notes, which are to be simultaneously performed at each time point when a new note is expected to be performed, by performing frequency modeling on the score information, and generates a list of the frequency models; a is storage unit that stores and manages the generated frequency model list; a performance location determiner that receives a frequency component of currently performed digital signal from the frequency analyzer and performs a matching operation on the received frequency component and the frequency model list stored in the storage unit so as to determine a current performance location; and a determination result output unit that provides the result of the performance location determiner to a user.

To achieve the second object of the present invention, there is provided a computer-readable recording medium in which control commands for executing the above score tracking method is recorded so that the score tracking method can be executed when the computer-readable recording medium is driven by a computer.

To achieve the third object of the present invention, there is provided a computer-executable method for automatically tracking a performance location in a score. The computer-executable method includes a first step of receiving an execution command; a second step of detecting a list of frequency models, which are expected to occur during music performance, from information about a score to be performed, in response to the execution command; a third step of analyzing a frequency component of digital signal, which is performed outside and received through an audio input unit of the computer or which is reproduced in the computer; a fourth step of generating a matching model of a frequency component, which is expected to occur at the time during the music performance, based on the frequency model list detected in the second step; and a fifth step of comparing the frequency component that is analyzed in the third step with the matching model generated in the fourth step to track a current performance location.

BEST MODE FOR CARRYING OUT THE INVENTION

Before setting forth a score tracking method and apparatus according to the present invention, terms used for explaining preferred embodiments of the present invention will be briefly reviewed.

An extracted frequency model (XFM) indicates a model of a frequency, which is detected from score information and is expected to be generated when music is performed with reference to the score.

A passed notes frequency model (PNFM) indicates a frequency model of a note, which was performed before the time. When it is determined whether real performance information matches the score information, the PNFM is used to consider frequency data of sound which still remains at present even if the sound was generated for a passed note.

A current notes frequency model (CNFM) indicates a frequency model of a note that is currently performed.

An expected notes frequency model (ENFM) indicates a frequency model of a note that is expected to be performed next.

A matching model M indicates an object which is compared with the real performance information at the time when it is determined whether the real performance information matches the score information. The matching model M is generated by combining the PNFM, the CNFM, and the ENFM.

A current performance frequency data (CPFD) indicates frequency components of digital signal that is currently input.

A previous performance frequency data (PPFD) indicates a CPFD inputted previously.

A score time (S_Time) indicates a value which is allocated to an XFM detected from the score information. The S_Time means a standby time from a time point when a current XFM is performed to a time point when the next XFM is expected to be performed and is used to detect a matching time (M_Time).

A tempo ratio (T_Ratio) indicates a ratio of a real performance time to the S_Time and is used to detect the M_Time.

Tempo variance (T_Variance) indicates variance of the T_Ratio and is used to detect the M_Time.

The M_Time indicates a standby time from a time point when matching occurs to a time point when the next matching is expected to occur and is detected from the S_Time, the T_Ratio, and the T_Variance.

A performance time (P_Time) indicates a real time that lapses since matching occurs, that is, a duration during which performance of a current note has been continued.

Hereinafter, a score tracking method and apparatus of the present invention will be described in detail with reference to the attached drawings.

Figure 1:
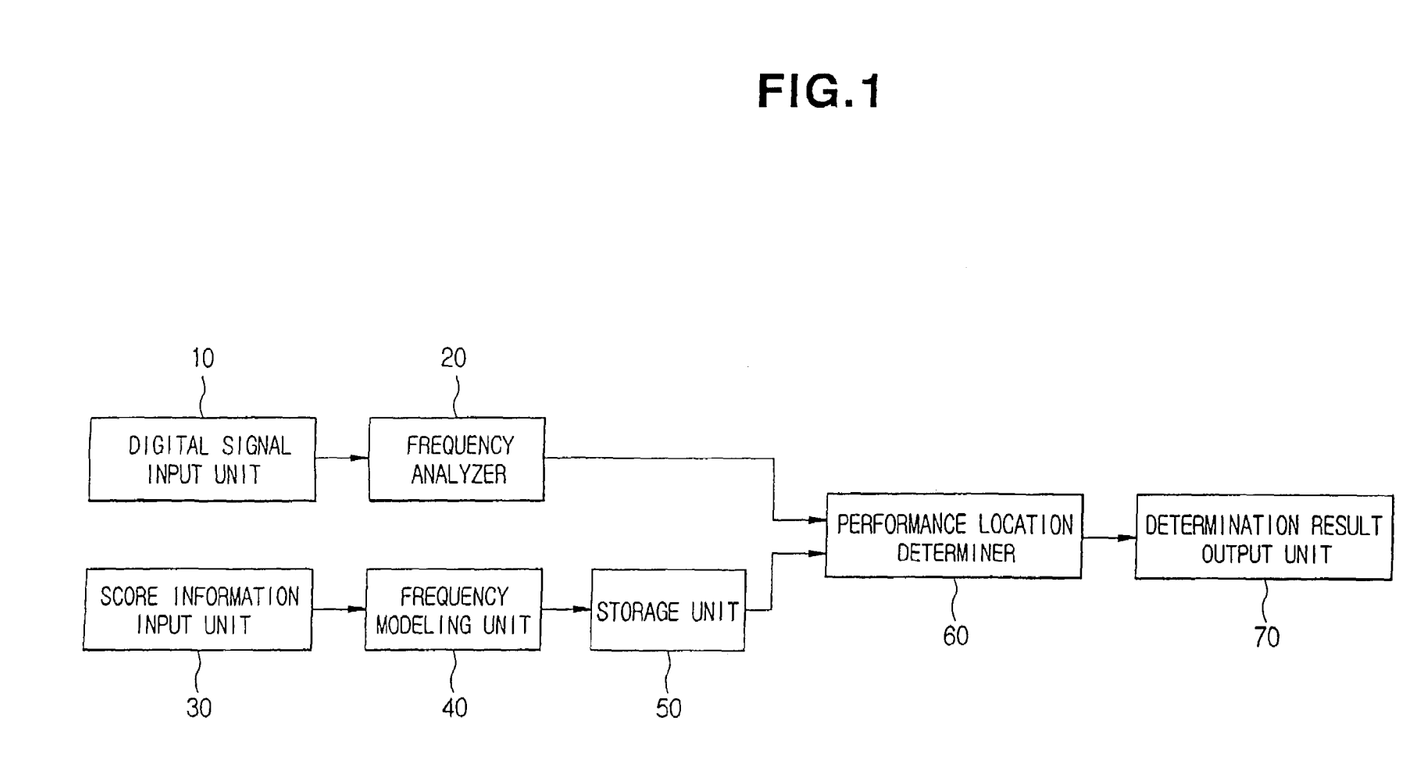
FIG. 1 is a schematic diagram of a score tracking apparatus according to an embodiment of the present invention.

FIG. 1 is a schematic diagram of a score tracking apparatus according to an embodiment of the present invention. Referring to FIG. 1, the score tracking apparatus of the present invention includes a digital signal input unit 10, a frequency analyzer 20, a score information input unit 30, a frequency modeling unit 40, a storage unit 50, a performance location determiner 60, and a determination result output unit 70.

The digital signal input unit 10 converts externally performed music into digital signal and receives the digital signal. When music is input through a microphone, the digital signal input unit 10 converts the music into digital signal using an analog-to-digital (A/D) converter. When music is input in the form of a music file such as music on a CD, MP3, or wave file, the digital signal input unit 10 converts the music into a wave format. Generally, in case of a computer, a sound card functions as an A/D converter.

The frequency analyzer 20 extracts a CPFD, which is performed currently, from the digital signal that is input from the digital signal input unit 10. Here, Fast Fourier Transformation (FFT) is used to analyze the digital signal into frequency. However, another method such as wavelet transformation may be used.

The score information input unit 30 receives score information of notes that is to be performed. More specifically, the score information input unit 30 inputs digital score data including pitch information and length information of each note. For example, the pitch and length information of each note can be extracted through scanning the score image or reading the score file written by any score writing software.

The frequency modeling unit 40 detects an XFM list by performing frequency modeling on the score information that is input from the score information input unit 30. In other words, the frequency modeling unit 40 detects XFMs of notes, which are to be simultaneously performed at a time point when a new note is expected to be performed, based on the score information and generates a list of the XFMs. A procedure for generating the XFM list from the score information will be described in detail with reference to FIGS. 9A through 9C.

The storage unit 50 stores and manages the XFM list that is generated by the frequency modeling unit 40.

When the performance location determiner 60 receives the CDFD of the currently performed digital signal from the frequency analyzer 20, it performs a matching operation on the CPFD and the XFM list stored in the storage unit 50 to determine a current performance location.

More specifically, the performance location determiner 60 generates a matching model M of a frequency component, which is expected to be generated at the time during performance of the music, based on the XFM list stored in the storage unit 50 and performance a matching operation on the CPFD received from the frequency analyzer 20 and the matching model M. Then, the performance location determiner 60 determines the current performance location based on the result of the matching operation.

Here, the matching model M is constituted by combining a PNFM, a CNFM, and an ENFM with respect to the time. The PNFM, the CNFM, and the ENFM are extracted from the XFM list.

The determination result output unit 70 provides the determination result received from the performance location unit 60. Here, a variety of methods including directly indicating a relevant performance location in an electronic score can be used to provide the determination result to the user. Due to determination of the current performance location, the distance between the current performance location and the last location of a current page of the score can be determined so that a signal for turning the page can be generated at an appropriate time point.

Figure 2:
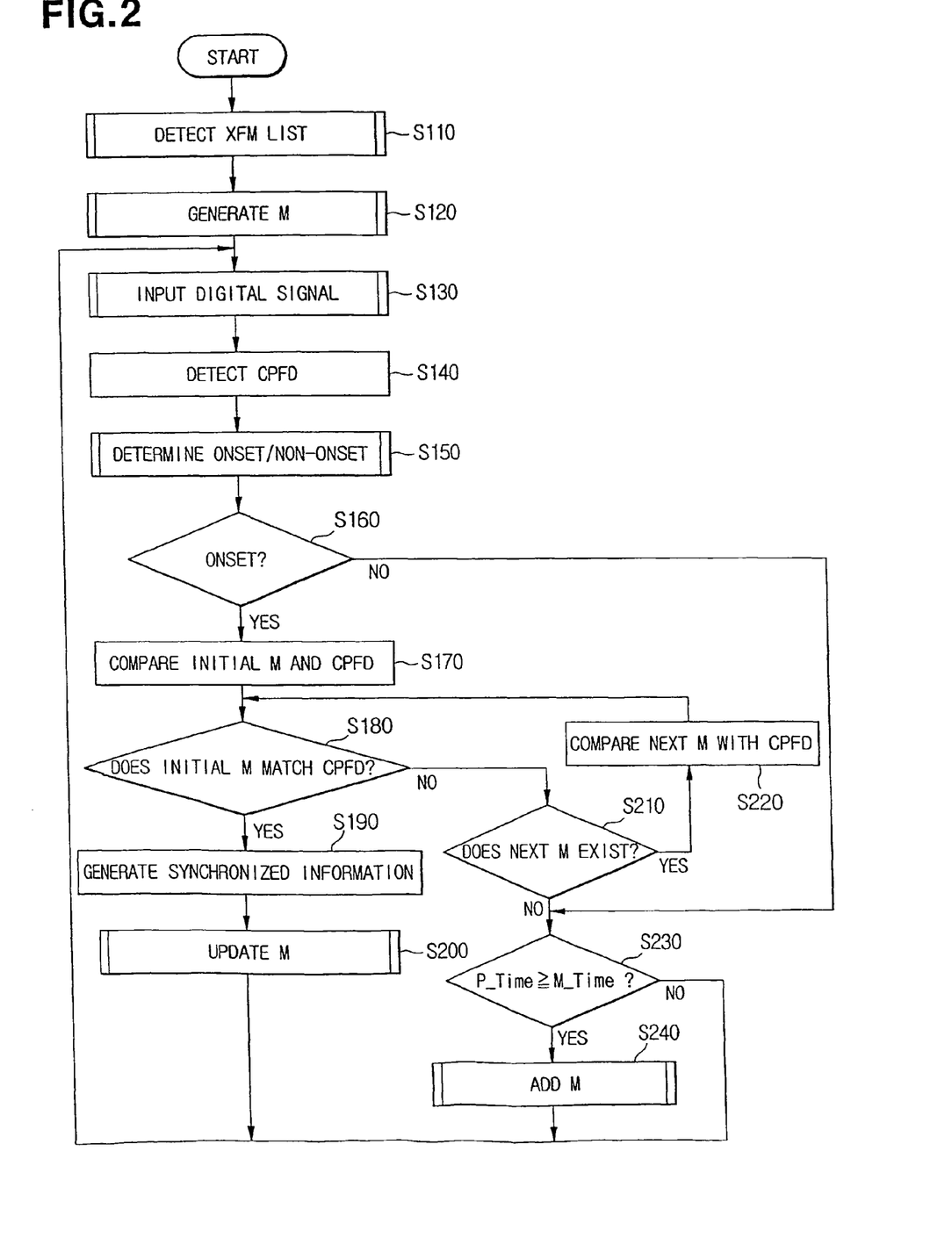
FIG. 2 is a flowchart of a score tracking method according to an embodiment of the present invention.

FIG. 2 is a flowchart of a score tracking method according to an embodiment of the present invention. Referring to FIG. 2, a list of XFMs, which are expected to match with input frequency data when music is performed with reference to the score, is detected from score information in step S110. Here, if audio information of a musical instrument to be played is obtained in advance, the XFM list is detected from the audio information. Otherwise, the XFM list is detected based on harmonic frequency of each note according to the kind of musical instrument.

Based on the XFM list, a matching model M, which is composed of frequency components that are expected to be included in the audio data externally input at the time, is generated in step S120.

Here, the matching model M is obtained by combining a PNFM which is a frequency model of a note performed before a current time, a CNFM which is a frequency model of a note performed at the current time, and an ENFM which is a frequency model of a note that is expected to be performed at the next time point, as shown in Formula (1).

$$M=PNFM+CNFM+ENFM \quad (1)$$

If the audio data is externally input, the audio data is converted into digital signal in step S130, and a CPFD is detected from the digital signal in step S140. Here, FFT is usually used to detect the CPFD from the digital signal, but another method such as wavelet transformation may be used.

It is determined whether a new frequency component is included in the CPFD, that is, it is determined onset/non-onset of a new frequency component, in steps S150 and S160. If it is determined that a new frequency component is included, that is, onset is determined, the CPFD is compared with the matching model M in step S170. More specifically, it is determined whether all frequency components included in the matching model M are included in the CPFD. Here, when there are a plurality of matching models M, an initial matching model M (for example, a matching model M which was generated at the earliest time point) is first selected and compared with the CPFD.

As a result of performing step S170, if it is determined that the matching model M matches the CPFD in step S180, a synchronized information between the real performing notes and the score notes is generated in step S190, and the matching model M is updated in step S200. When updating the matching model M or adding another matching model M, a M_Time used for score tracking is also set. The M_Time is set on the basis of a S_Time, which is an expected standby time from a time point when the matching model M matches the CPFD to a time point when the ENFM of the matching model M is to be performed. More specifically, the M_Time is calculated by multiplying the S_Time by a T_Ratio and a T_Variance to consider the performance tempo of a relevant player, as shown in Formula (2).

$$M\_Time=S\_Time*T\_Ratio*T\_Variance \quad (2)$$

On the contrary, as a result of performing step S170, if it is determined that the matching model M does not match the CPFD, the remaining matching models that have not been matched after being generated are sequentially selected starting from the earliest one and compared with the CPFD in step S210 and S220. If there is a matching model M that match the CPFD as a result of comparison, a synchronized information between the real performing notes and the score notes is generated in step S190, and the remaining matching models M other than the matching model M matching the CPFD are removed, and the matching model M is updated in step S200.

If matching between the CPFD and the matching model M is not achieved until a P_Time, during which a current performing note included in the CPFD is continued, is equal to or greater than the M_Time which is set for the matching model that is generated to be compared with the CPFD in step S230, a new matching model is added in step S240. In other words, the new matching model including the XFM, which is expected to be performed at the next time point following the ENFM included in the current matching model, is added in step S240. This is for compensating for a case where a player omits a note on the score.

Figure 3:
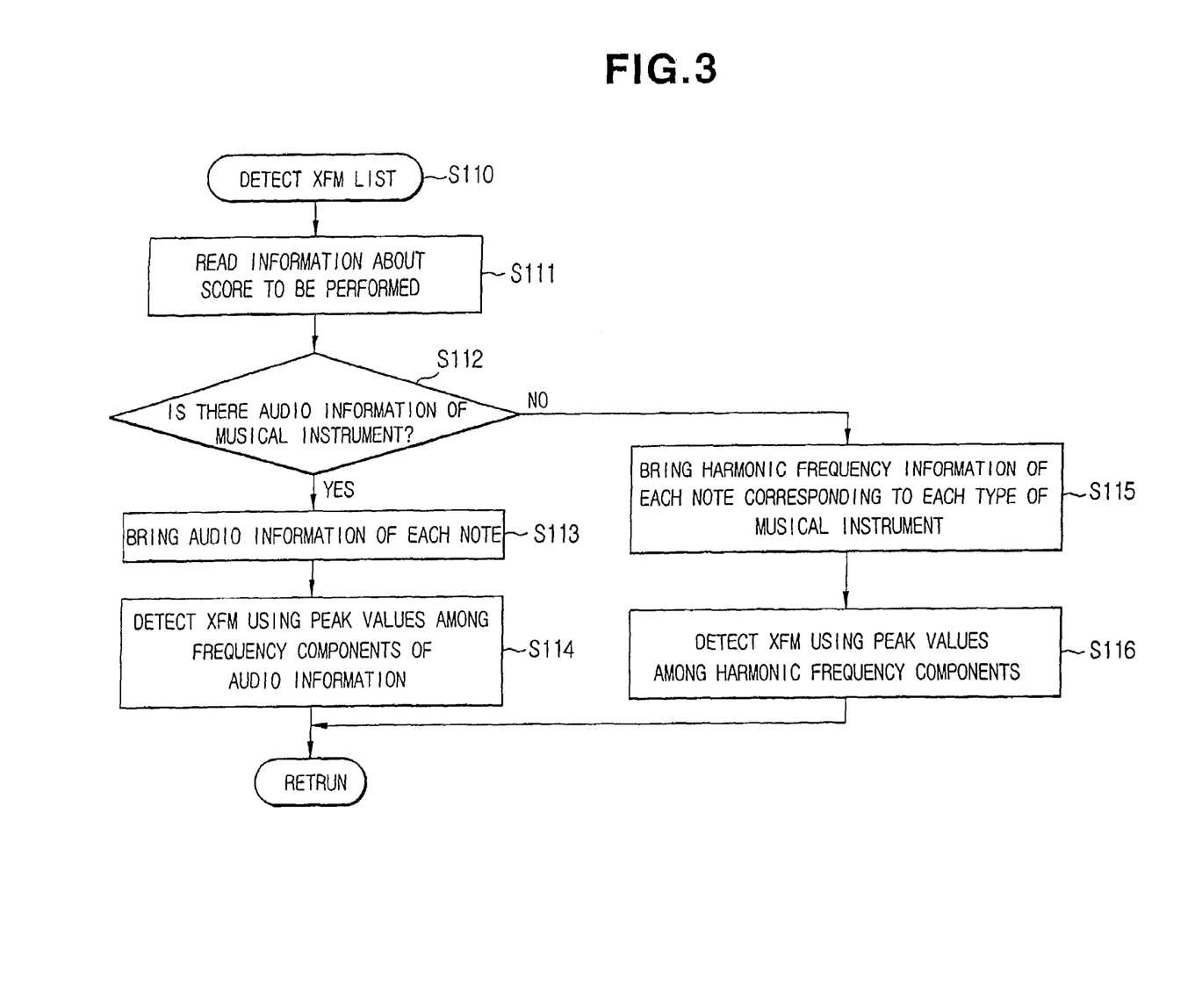
FIG. 3 is a flowchart of a procedure for detecting an extracted frequency model (XFM) list according to the embodiment of the present invention.

FIG. 3 is a flowchart of the step S10 of detecting the XFM list according to the embodiment of the present invention. Referring to FIG. 3, information about the score to be performed is read in step S111. Then, it is checked whether there is audio information of a musical instrument to be played in step S112.

If it is determined that there is audio information of a relevant musical instrument in step S112, audio information of each note included in the score information is brought from the audio information in step S113, and the XFM list is detected using peak values among frequency components of the audio information of each note in step S114.

If it is determined that there is no audio information of a relevant musical instrument in step S112, harmonic frequency components of each note corresponding to each type of musical instrument are extracted in step S115. Then, the XFM list is detected using peak values among the harmonic frequency components in step S116.

Figure 4:
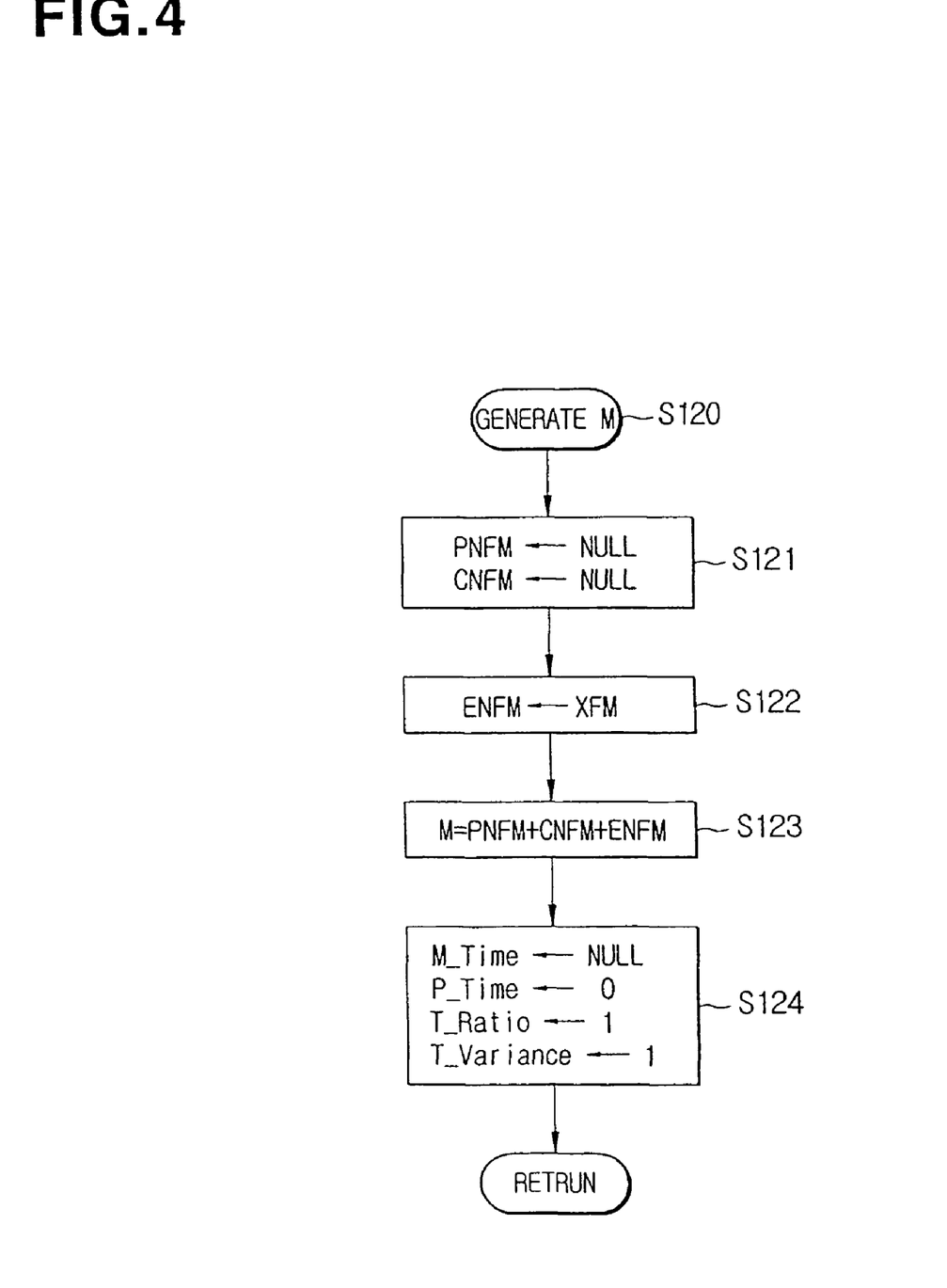
FIG. 4 is a flowchart of a procedure for generating a matching model according to the embodiment of the present invention.

FIG. 4 is a flowchart of the step S120 of generating the matching model M according to the embodiment of the present invention.

Referring to FIG. 4, for the initially matching model M, since performance is not started yet, the PNFM and the CNFM that constitute the matching model M are set to be null in step S121, and the ENFM is set to an XFM, which is expected to be initially performed from the XFM list, in step S122. The PNFM, the CNFM, and the ENFM are combined to generate the matching model M in step S123.

In addition, in order to adjust a score tracking speed in accordance with a performance tempo depending on the characteristics of the player or a reproducing apparatus, the initial values of variables, i.e., M_Time, P_Time, T_Ratio, and T_Variance, which are used for determining the performance tempo, are set in step S124.

The M_Time indicates a standby time of each matching model for matching. For the initial matching model M, since the performance is not started yet, the M_Time is set to an invalid arbitrary value (form example, NULL).

The P_Time indicates a continuous time of a current performing note. The initial value of the P_Time is set to "0", and the value is increased until the matching model M matches the CPFD.

The T_Ratio indicates a performance tempo ratio, that is, a ratio of real matching time to the M_Time and has an initial value of 1. For example, when T_Ratio is 2, real performance is two times slower than is expected.

The T_Variance indicates performance tempo variance and has an initial value of 1. For example, when T_Variance is 1.1, the tempo of the real performance decreases 10 percents.

Figure 5:
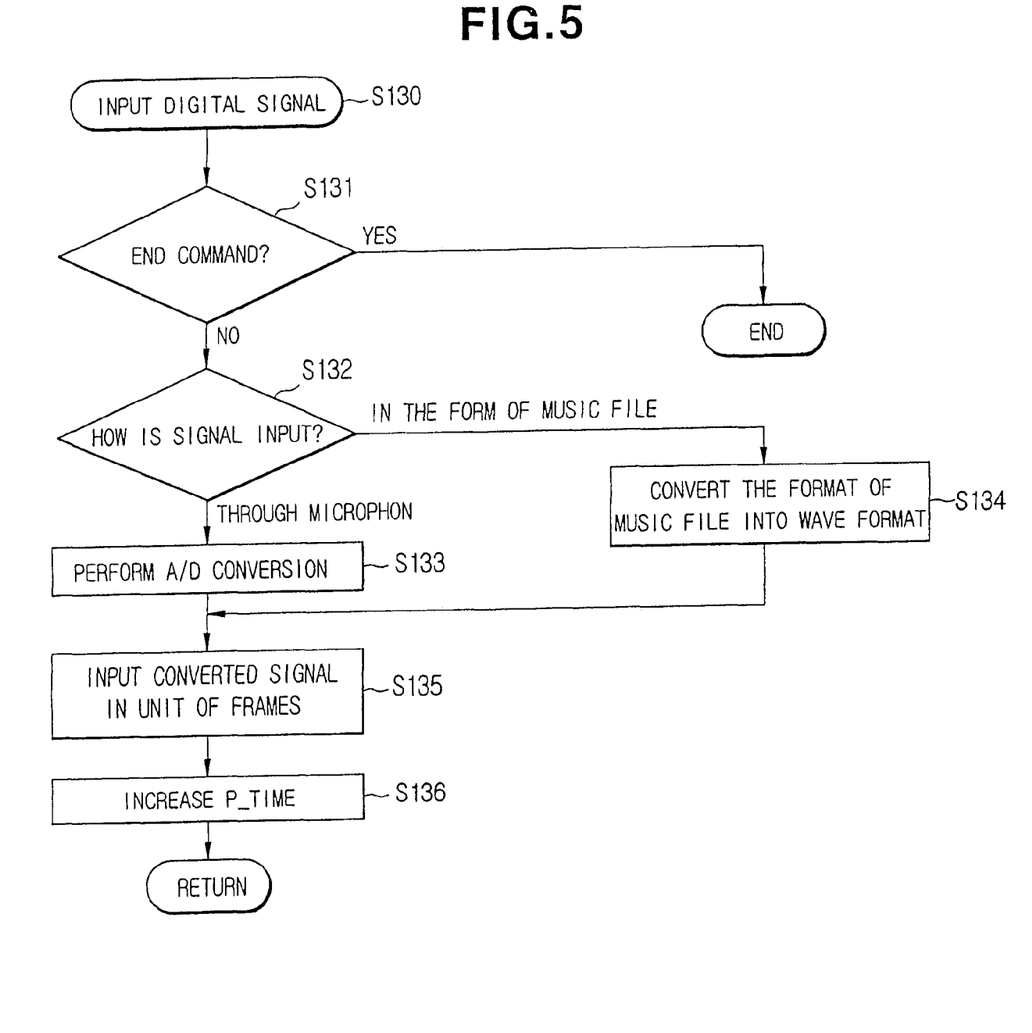
FIG. 5 is a flowchart of a procedure for inputting digital signal according to the embodiment of the present invention.

FIG. 5 is a flowchart of the step S130 of inputting digital signal according to the embodiment of the present invention. Referring to FIG. 5, input of the digital signal is continued until an end command is input from the outside in step S131. Input of the digital signal varies with a method of inputting external audio data. More specifically, in steps S132 through S134, when the audio data is input through a microphone, A/D conversion is performed S133, and when the audio data is input in the form of a music file, the format of the music file is converted S134.

The converted audio information is input in units of frames in step S135. In order to determine the performance tempo, the P_Time indicating time during which a current performing note is continued is increased in step S136.

Figure 6:
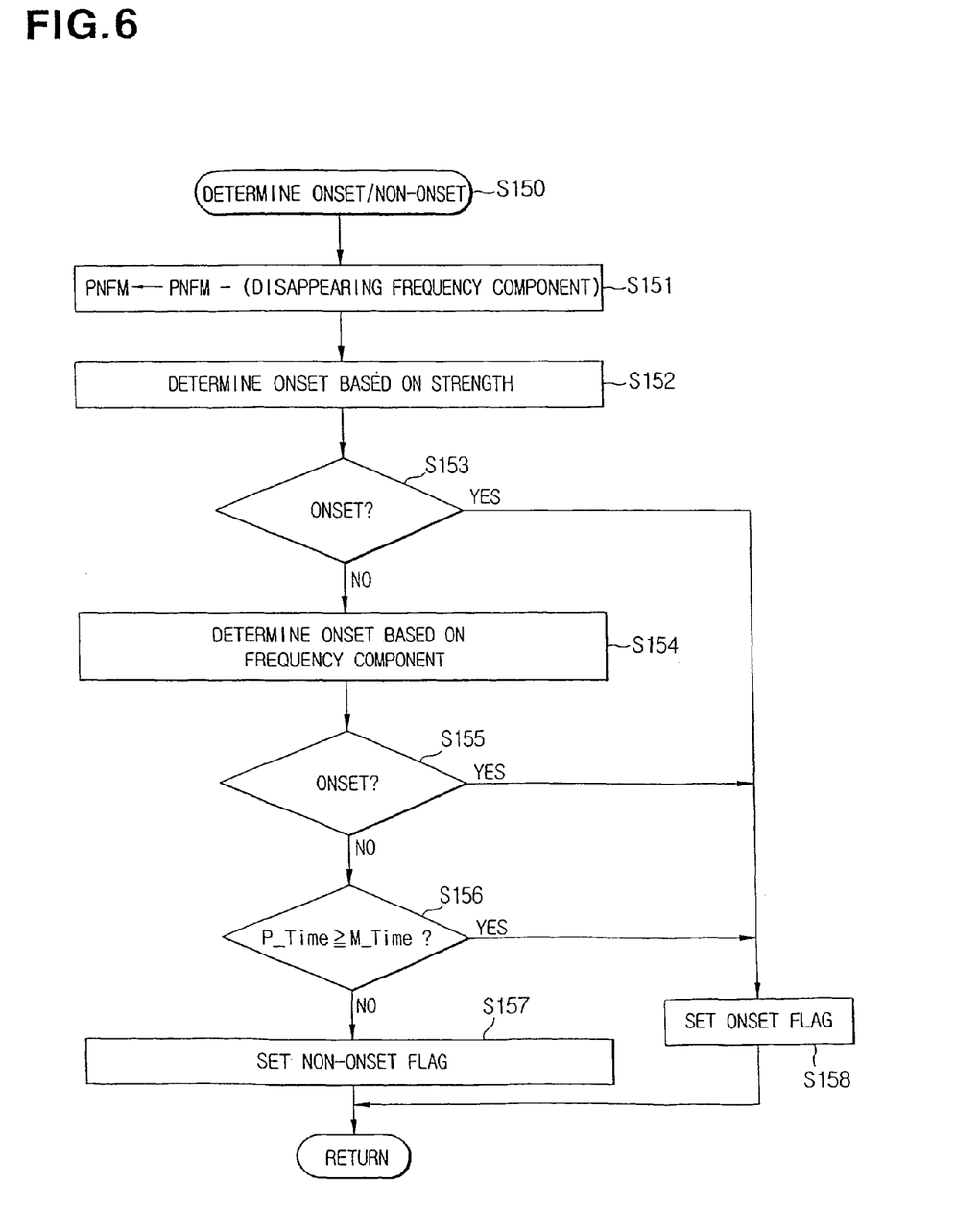
FIG. 6 is a flowchart of a procedure for determining onset/non-onset of a new frequency according to the embodiment of the present invention.

FIG. 6 is a flowchart of the step S150 of determining onset/non-onset of a new frequency according to the embodiment of the present invention. Referring to FIG. 6, a frequency component that disappears at a current time is detected and is removed from frequency information included in the matching model M in step S151. For this, the CPFD included in the currently input audio data is compared with the PPFD included in audio data that was input at the previous time point. Then, a frequency component that is included in the PPFD but is not included in the CPFD is detected and removed.

Next, in steps S152 through S155, strengths and frequency component values are compared between the CPFD and the PPFD to determine whether a new frequency component is included in the CPFD, that is, to determine onset/non-onset of a new frequency component. Here, while detecting onset in order to determine whether the next note has been performed, onset is determined based on a rapid increase in the strength of audio in steps S152 and S153 and is then determined based on whether a new frequency component is included in the CPFD in order to take into account a case where audio, such as sound of a wind instrument, changes only in pitch without having a change in strength in steps S154 and S155.

As a result of determination performed in steps S152 through S155, if onset is determined, an onset flag is set in step S158. Otherwise, a non-onset flag is set in step S157.

In the meantime, if it is determined that the P_Time exceeds the M_Time for the current matching model M in step S156, it is considered that onset occurs and thus an onset flag is set in step S158.

Figure 7:
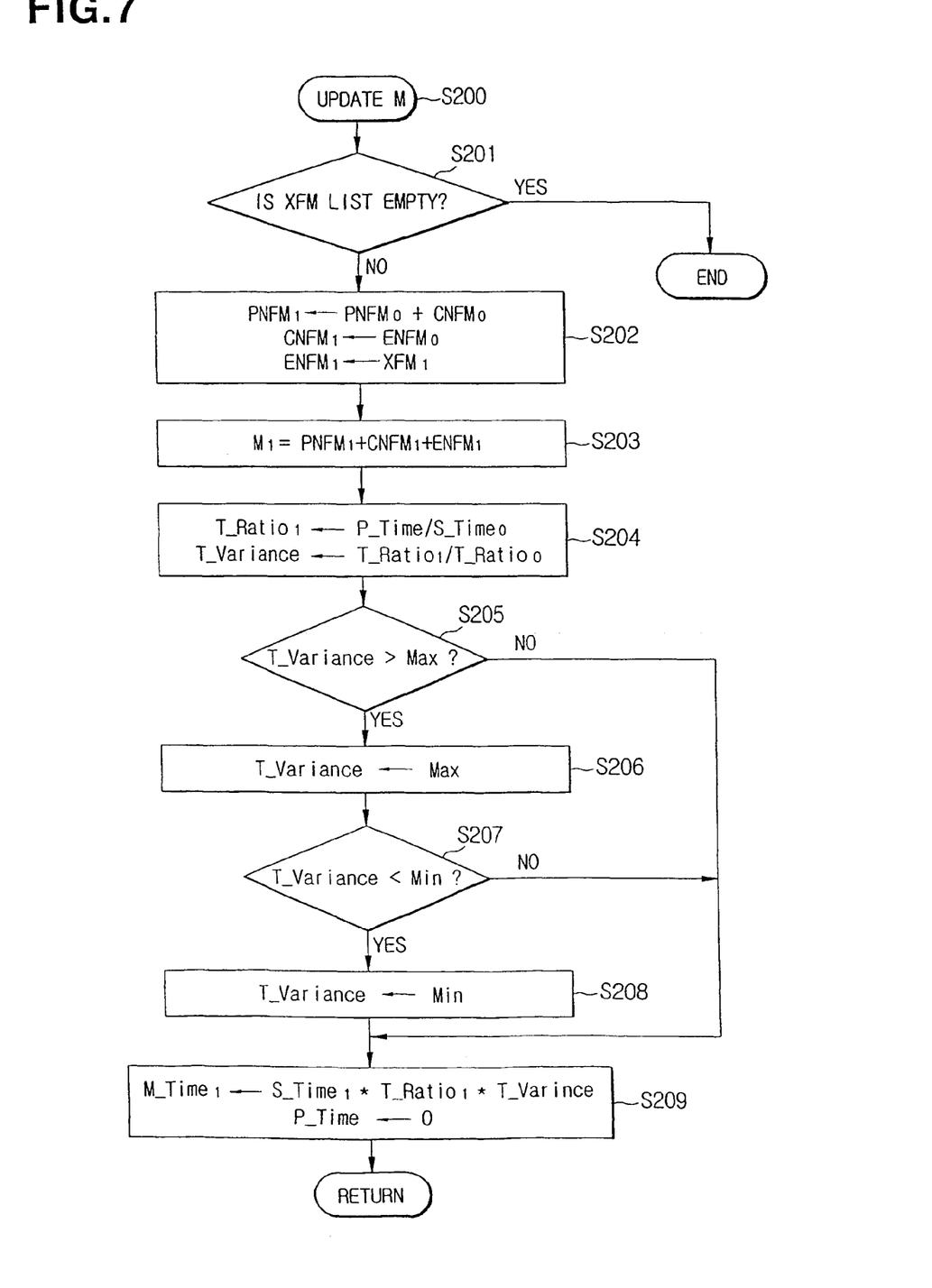
FIG. 7 is a flowchart of a procedure for updating the matching model according to the embodiment of the present invention.

FIG. 7 is a flowchart of the step S200 of updating the matching model M according to the embodiment of the present invention. More specifically, FIG. 7 is a flowchart of a procedure for updating a matching model $M_0 = PNFM_0 + CNFM_0 + ENFM_0$ having a score time $S\_Time_0$ with a matching model $M_1 = PNFM_1 + CNFM_1 + ENFM_1$ having a score time $S\_Time_1$.

Referring to FIG. 7, it is determined whether the XFM list is empty step S201. The update of the matching model proceeds as follows when it is determined that the XFM list is not empty.

In other words, the matching model $M_1$ is generated by performing frequency transfer on the matching model $M_0$. This will be described in more detail below.

In step S202, a new passed notes frequency model $PNFM_1$ is generated by combining a passed notes frequency model $PNFM_0$ and a current notes frequency model $CNFM_0$ included in the matching model $M_0$, that is, $PNFM_1 \leftarrow PNFM_0 + CNFM_0$; a new current notes frequency model $CNFM_1$ is generated using an expected notes frequency model $ENFM_0$ included in the matching model $M_0$, that is, $CNFM_1 \leftarrow ENFM_0$; and a new expected notes frequency model $ENFM_1$ is generated by selecting an extracted frequency model $XFM_1$, which is expected to be performed at the next time point, from the XFM list.

Then, in step S203, a new matching model $M_1$ is generated by combining the frequency models, i.e., $PNFM_1$, $CNFM_1$, and $ENFM_1$.

If the new matching model $M_1$ is generated with such arrangement, a matching time $M\_Time_1$ for the matching model $M_1$ is detected in steps S204 through S209.

More specifically, in step S204, the value of the T_Ratio and the value of the T_Variance are calculated with respect to current performance in step S204. In step S209, the matching time $M\_Time_1$ for the new matching model $M_1$ is calculated using the T_Ratio and the T_Variance, and since matching of the matching model $M_0$ is accomplished, the P_Time is initialized.

In the meantime, in order to prevent the M_Time from rapidly and incorrectly changing due to a mistake or wrong matching, in steps S205 through S208 the limits of the T_Variance are fixed to a minimum value MIN and a maximum value MAX so that the T_Variance is set within the limits.

Figure 8:
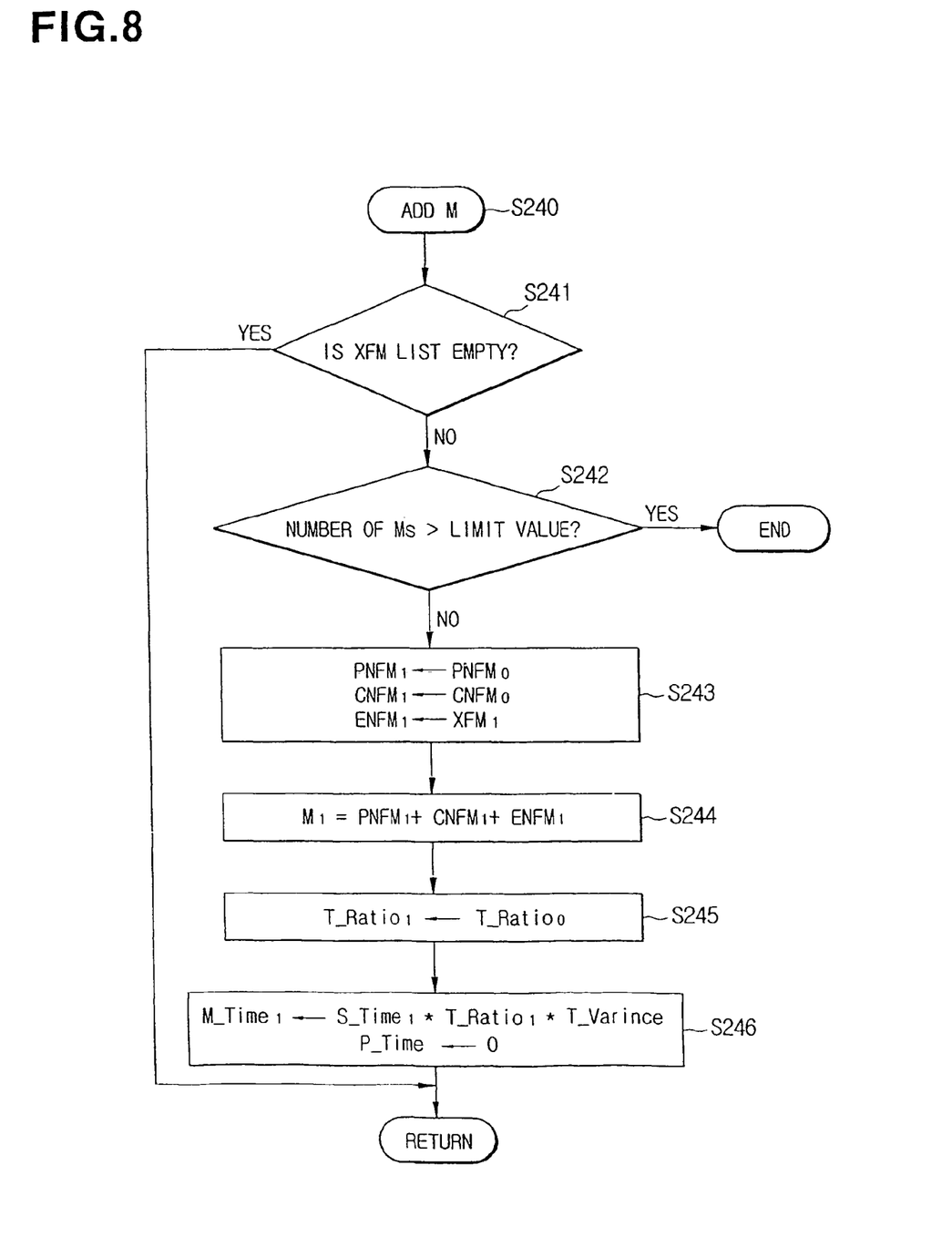
FIG. 8 is a flowchart of a procedure for adding a matching model according to the embodiment of the present invention.

FIG. 8 is a flowchart of the step S240 of adding another matching model M according to the embodiment of the present invention. More specifically, FIG. 8 shows a procedure of adding a new matching model $M_1 = PNFM_1 + CNFM_1 + ENFM_1$ having a score time $S\_Time_1$ with the existing matching model $M_0 = PNFM_0 + CNFM_0 + ENFM_0$ having a score time $S\_Time_0$ left as it is when the matching model $M_0$ does not have any match until a matching time $M\_Time_0$ for the matching model $M_0$ lapses.

Referring to FIG. 8, the adding of the matching model proceeds as follows when it is determined that the XFM list is not empty in step S241.

In step S243, a passed notes frequency model $PNFM_0$ and a current notes frequency model $CNFM_0$ included in the matching model $M_0$ are taken as they are; and only a new expected notes frequency model $ENFM_1$ is generated as an extracted frequency model $XFM_1$, which is expected to be performed at the next time point after performance of an expected notes frequency model $ENFM_0$. In other words, the passed notes frequency model $PNFM_0$ and the current notes frequency model $CNFM_0$ are applied as they are as new passed notes frequency model $PNFM_1$ and current notes frequency model $CNFM_1$, respectively, and only the new expected notes frequency model $ENFM_1$ is set to the newly selected frequency model $XFM_1$.

Then, in step S244, a new matching model $M_1$ is generated by combining the frequency models, i.e., $PNFM_1$, $CNFM_1$, and $ENFM_1$.

If the new matching model $M_1$ is generated with such arrangement, a matching time $M\_Time_1$, during which the expected notes frequency model $ENFM_1$ included in the matching model $M_1$ is expected to be performed, is calculated in steps S245 and S246. Here, since there is no variance in tempo, a new matching time $M\_Time_1$ for the new matching model $M_1$ is calculated using tempo information, i.e., $T\_Ratio_0$, of the matching model $M_0$, as shown in step S246 of FIG. 8.

In the meantime, when errors consecutively occur in performing music during a predetermined period of time, it is meaningless to continue score tracking. Accordingly, the number of matching models M, which remain without having matches after being generated, is limited, and if the number of remaining matching models M exceeds a predetermined limit value in step S242, a new matching model is not added and the operation ends.

Figure 9A:
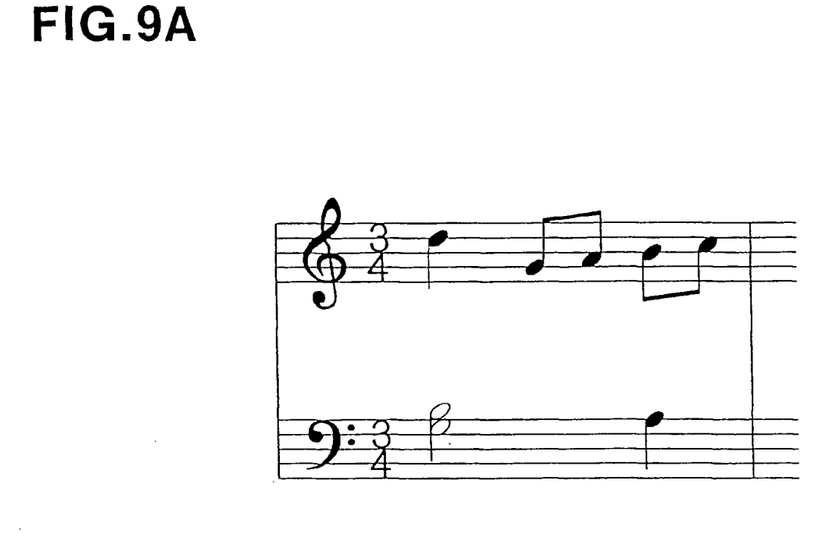
FIGS. 9A through 9C show an example of a procedure for detecting the XFM list from score information according to the embodiment of the present invention.
Figure 9B:
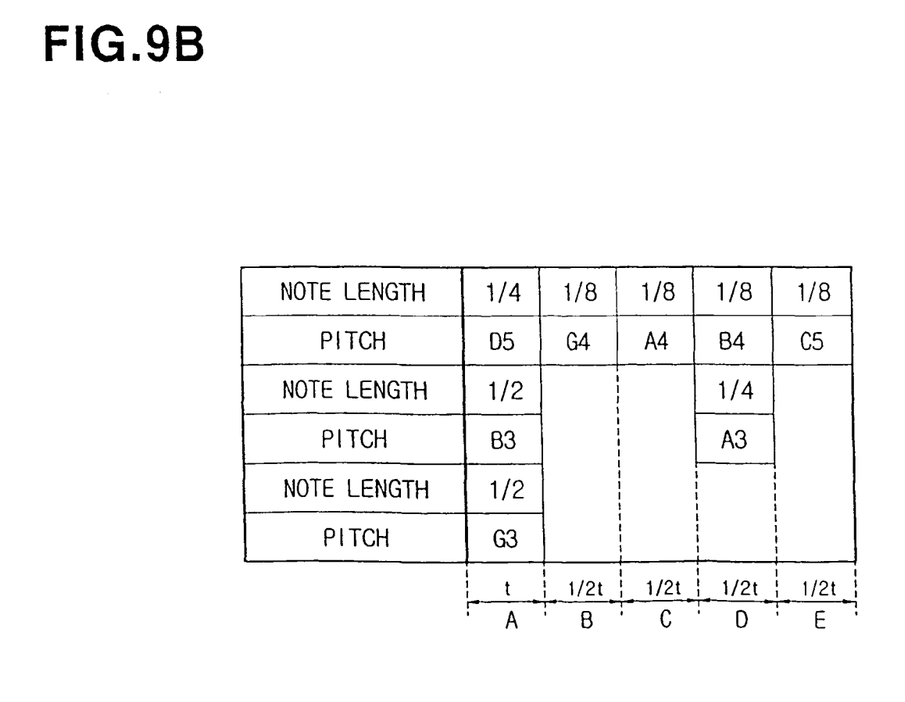
Figure 9C:
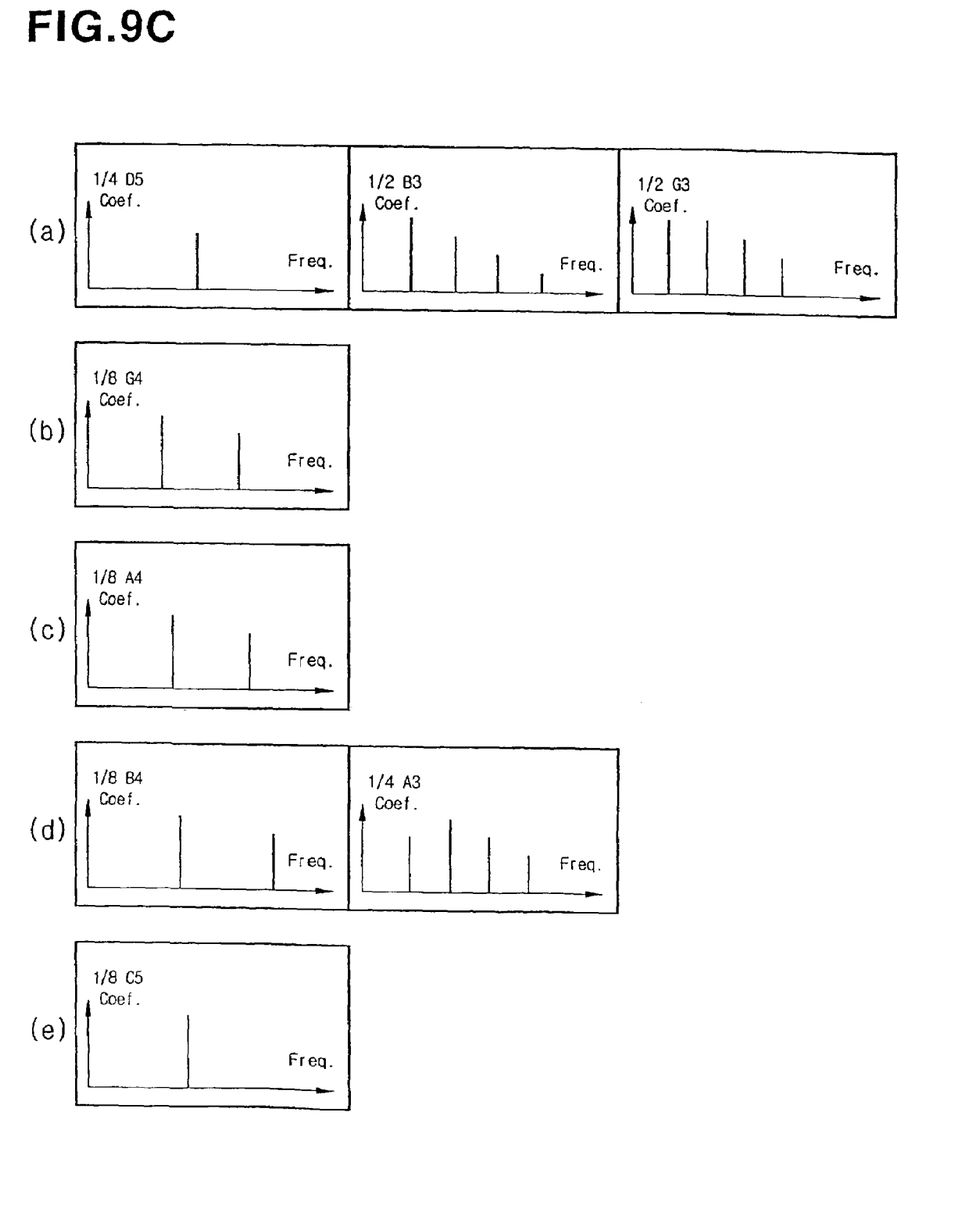

FIGS. 9A through 9C show an example of a procedure for detecting the XFM list from score information according to the embodiment of the present invention.

When score information shown in FIG. 9A is input to the frequency modeling unit 40 shown in FIG. 1, the frequency modeling unit 40 receives pitch and length information of each note of the score information, as shown in FIG. 9B, and detects frequency models using pitch information of the individual notes, as shown in FIG. 9C.

Here, each of time intervals A, B, C, D, and E shown in FIG. 9B is set for a note to be performed in a corresponding time interval A, B, C, D, or E and for waiting for input of sound of the next note. For example, during the time interval A, a ¼ D5 note, a ½ B3 note, and a ½ G3 note are simultaneously performed, and performance of a ⅛ G4 note is waited for. In addition, the length of each time interval A, B, C, D, or E is usually determined based on the length of a note which is performed only in the corresponding time interval A, B, C, D, or E. For example, when the length of the time interval A is set to "t", each of the remaining time intervals B, C, D, and E is set to "½t".

FIG. 9C shows frequency models detected based on the pitch and length information of the individual notes included in the score information. FIG. 9C(a) shows frequency models of notes included in the time interval A. FIG. 9C(b) shows a frequency model of a note included in the time interval B. FIG. 9C(c) shows a frequency model of a note included in the time interval C. FIG. 9C(d) shows frequency models of notes included in the time interval D. FIG. 9C(e) shows a frequency model of a note included in the time interval E. When a plurality pieces of note information is included in a single time interval as shown in FIGS. 9C(a) and (d), a value of summation of all frequency models included in each time interval is stored in the storage unit 50.

Figure 10:
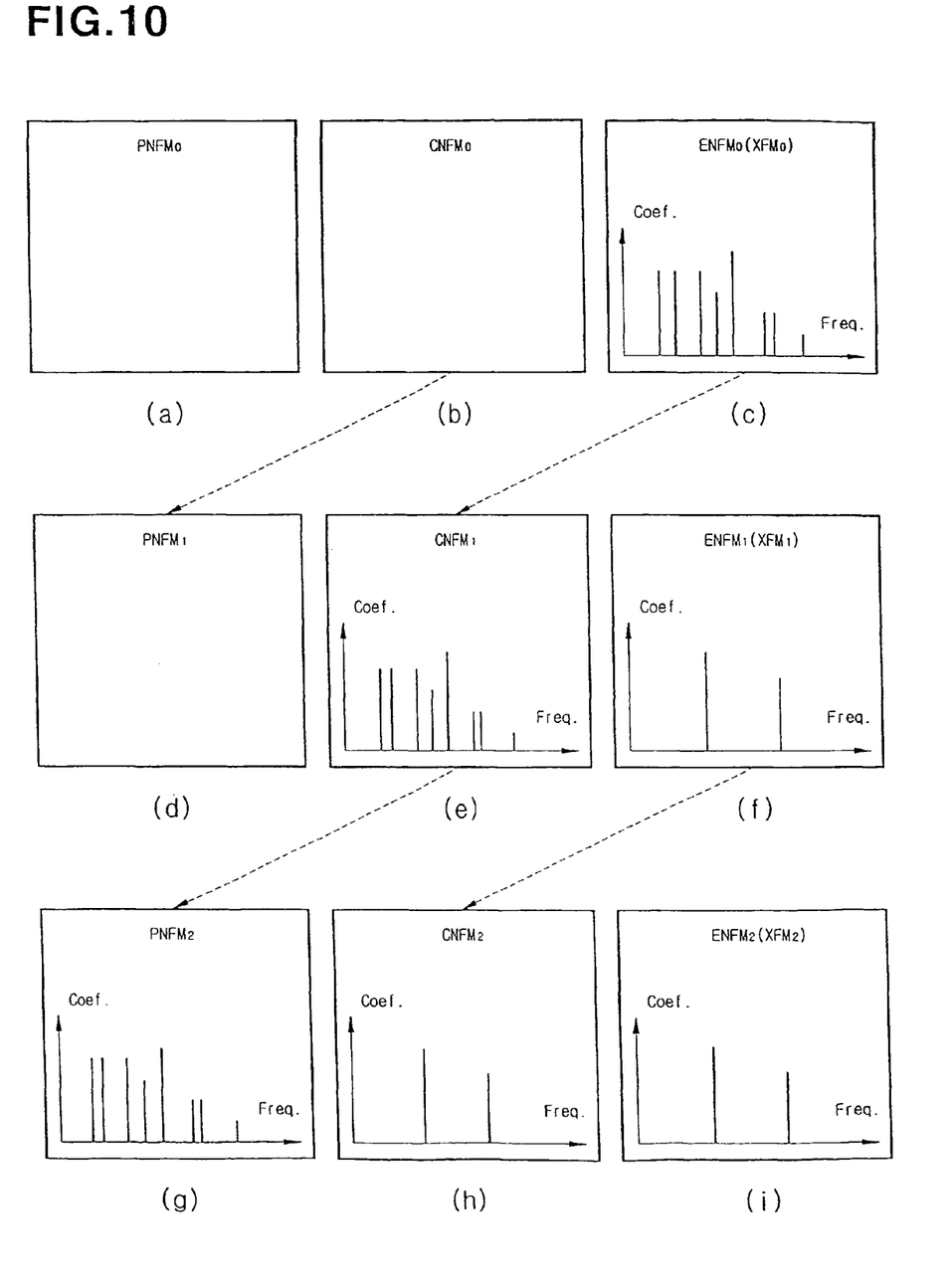
FIG. 10 shows an example of a procedure for generating and updating the matching model according to the embodiment of the present invention.

FIG. 10 shows an example of a procedure for generating and updating a matching model according to the embodiment of the present invention.

FIGS. 10(a), 10(d), and 10(g) show PNFMs at the times, respectively. FIGS. 10(b), 10(e), and 10(h) show CNFMs at the respective the times. FIGS. 10(c), 10(f), and 10(i) show ENFMs at the respective the times points.

FIGS. 10(a), 10(b), and 10(c) show frequency models which constitute an initially set matching model $M_0$. FIGS. 10(d), 10(e), and 10(f) show frequency models which constitute a matching model $M_1$, which is newly generated through frequency transfer after the matching model $M_0$ was matched with a CPFD at the time. FIGS. 10(g), 10(h), and 10(i) show frequency models which constitute a matching model $M_2$, which is newly generated through frequency transfer after the matching model $M_1$ was matched with a CPFD at a time point after the above the time.

According to the present invention, control commands for executing the above-described steps can be recorded in a computer-readable recording medium so that the steps can be performed in a general computer.

The above description just concerns embodiments of the present invention. The present invention is not restricted to the above embodiments, and various modifications can be made thereto within the scope defined by the attached claims. For example, the shape and structure of each member specified in the embodiments can be changed.

INDUSTRIAL APPLICABILITY

According to a score tracking method and apparatus of the present invention, a performance location in a score can be automatically tracked based performance information on monophonic or polyphonic notes performed in real time. A page-turning signal is automatically generated at an appropriate time point, based on the result of tracking the performance location, so that players do not need to turn pages of a score himself/herself using a timer or a special switch. Therefore, players can be devoted to performance only.

What is claimed is:

1. A score tracking method comprising:
   detecting frequency models with pitch and length information of score notes to be performed, and compiling a list of frequency models;
   generating a matching model, which is composed of frequency components that are included in audio data to be generated during a performance of the score notes, based on the frequency model list;
   receiving external audio data during an actual performance of the score notes, converting the audio data into digital signal, and detecting current performance frequency data from the digital signal;
   determining whether the current performance frequency data includes a new frequency component;
   determining whether the matching model matches the current performance frequency data when the new frequency component is included in the current performance frequency data; and
   generating synchronized information between the actual performance of the score notes and the score notes and updating the matching model, when it is determined that the matching model matches the current performance frequency data;
   wherein detecting frequency models with pitch and length information of score notes to be performed, and compiling a list of frequency models comprises:
      reading information of the score notes to be performed;
      determining whether there is audio information about musical instruments to be played according to the score notes;
      when it is determined that there is audio information about musical instruments, extracting audio information of each score note, from the audio information about musical instruments and detecting the frequency model list using peak values among frequency components of the audio information of each score; and
      when it is determined that audio information about musical instruments does not exist, extracting harmonic frequency components of each score note, which corresponds to each type of musical instrument, and detecting the frequency model list using peak values among the harmonic frequency components.

2. A score tracking in method comprising:
   detecting frequency models with pitch and length information of score notes to be performed, and compiling a list of frequency models;
   generating a matching model, which is composed of frequency components that are included in audio data to be generated during a performance of the score notes, based on the frequency model list;
   receiving external audio data during an actual performance of the score notes, converting the audio data into digital signal and detecting current performance frequency data from the digital signal;
   determining whether the current performance frequency data includes a new frequency component;
   determining whether the matching model matches the current performance frequency data when the new frequency component is included in the current performance frequency data; and
   generating synchronized information between the actual performance of the score notes and the score notes and updating the matching model, when it is determined that the matching model matches the current performance frequency data;
   wherein generating a matching model comprises combining a passed notes frequency model, which is a frequency model of a score note that has been performed previously, a current notes frequency model, which is a frequency model of a score note that is performed at the current time, and an expected notes frequency model, which is a frequency model of a score note that is performed next; and
   wherein generating a matching model further comprises:
      setting the passed notes frequency model and the current notes frequency model to a null value, selecting a frequency model, which is initially performed, from the frequency model list, and setting the frequency model as the expected notes frequency model;
      generating the matching model by combining the passed notes frequency model, the current notes frequency model, and the expected notes frequency model; and
      setting a matching time for the matching model to an invalid value.
3. A score tracking method comprising:
   detecting frequency models with pitch and length information of score notes to be performed, and compiling a list of frequency models:
   generating a matching model, which is composed of frequency components that are included in audio data to be generated during a performance of the score notes, based on the frequency model list;
   receiving external audio data during an actual performance of the score notes, converting the audio data into digital signal, and detecting current performance frequency data from the digital signal;
   determining whether the current performance frequency data includes a new frequency component;
   determining whether the matching model matches the current performance frequency data when the new frequency component is included in the current performance frequency data; and
   generating synchronized information between the actual performance of the score notes and the score notes and updating the matching model, when it is determined that the matching model, matches the current performance frequency data;
   wherein the determining whether the current performance frequency data includes a new frequency component comprises:
      comparing the current performance frequency data, which is included in the audio data input at a current time, with previous performance frequency data, which was included in audio data inputted previously, and detecting a frequency component disappearing at the current time;
      removing the disappearing frequency component from the frequency components included in the matching model;
      comparing the current performance frequency data with the previous performance frequency data in both strength and frequency component value so as to determine whether the new frequency component is included in the current performance frequency data; and
      determining that the new frequency component is included in the current performance frequency data either when it is determined that the new frequency component is included in the current performance frequency data or when a matching time for the matching model has lapsed since previous matching was accomplished in a state where the new frequency component does not exist.
4. A score tracking method comprising:
   detecting frequency models with pitch and length information of score notes to be performed, and compiling a list of frequency models;
   generating a matching model which is composed of frequency components that are included in audio data to be generated during a performance of the score notes, based on the frequency model list;
   receiving external audio data during an actual performance of the score notes, converting the audio data into digit signal, and detecting current performance frequency data from the digital signal;
   determining whether the current performance frequency data includes a new frequency component;
   determining whether the matching model matches the current performance frequency data when the new frequency component is included in the current performance frequency data; and
   generating synchronized information between the actual performance of the score notes and the score notes and updating the matching model, when it is determined that the matching model matches the current performance frequency data;
   wherein generating synchronized information comprises:
      generating a new passed notes frequency model by combining a passed notes frequency model and a current notes frequency model which are included in the matching model;
      generating a new current notes frequency model using an expected notes frequency model included in the matching model;
      selecting a frequency model, which is performed next, from the frequency model list and generating it as a new expected notes frequency model;
      generating a new matching model by combining the new passed notes frequency model, the new current notes frequency model, and the new expected notes frequency model; and
      determining a current performance tempo by comparing the matching time for the matching model with time information from a time point when the matching model is generated to a time point when a real matching is accomplished and detecting a matching time for the new matching model based on the current performance tempo.

5. A score tracking method comprising:
detecting frequency models with pitch and length information of score notes to be performed, and compiling a list of frequency model;
generating a matching model, which is composed of frequency components that are included in audio data to be generated during a performance of the score notes based on the frequency model list;
receiving external audio data during an actual performance of the score notes, converting the audio data into digital signal, and detecting current performance frequency data from the digital signal;
determining whether the current performance frequency data includes a new frequency component;
determining whether the matching model matches the current performance frequency data when the new frequency component is included in the current performance frequency data; and
generating synchronized information between the actual performance of the score notes and the score notes and updating the matching model, when it is determined that the matching model matches the current performance frequency data;
wherein when the matching model does not match the current performance frequency data, further comprising:
sequentially selecting matching models, which remain without being matched since being generated, starting from a matching model that was generated first and determining whether they match the current performance frequency data; and
when a selected matching model matches the current performance frequency data, generating synchronized information between the actual performance of the score notes and the score notes, removing the remaining matching models other than the selected matching model, and updating the matching model.

6. The score tracking method of claim 5, wherein when a selected matching model matches the current performance frequency data, generating synchronized information between the actual performance of the score notes and the score notes, removing the remaining matching models other than the selected matching model, and updating the matching model comprises:
generating a new passed notes frequency model by combining a passed notes frequency model and a current notes frequency model, which are included in the matching model;
generating a new current notes frequency model using an expected notes frequency model included in the matching model;
selecting a frequency model, which is performed next, from the frequency model list and generating it as a new expected notes frequency model;
generating a new matching model by combining the new passed notes frequency model, the new current notes frequency model, and the new expected notes frequency model; and
determining a current performance tempo by comparing the matching time for the matching model with time information from a time point when the matching model is generated to a time point when a real matching is accomplished and detecting a matching time for the new matching model based on the current performance tempo.

7. A score tracking method comprising:
detecting frequency models with pitch and length information of score notes to be performed, and compiling a list, of frequency models;
generating a matching model, which is composed of frequency components that are included in audio data to be generated during a performance of the score notes, based on the frequency model list;
receiving external audio data during an actual performance of the score notes, converting the audio data into digital signal, and detecting current performance frequency data from the digital signal;
determining whether the current performance frequency data includes a new frequency component;
determining whether the matching model matches the current performance frequency data when the new frequency component is included in the current performance frequency data; and
generating synchronized information between the actual performance of the score notes and the score notes and updating the matching model, when it is determined that the matching model matches the current performance frequency data;
wherein when the matching model does not match the current performance frequency data until a matching time for the matching model lapses, further comprising adding a new matching model that includes a frequency model, which is included in the frequency model list and is to be performed at a next time point after performance of an expected notes frequency model; and
wherein adding a new matching model comprises:
generating a new passed notes frequency model using a passed notes frequency model that is included in the matching model;
generating a new current notes frequency model using a current notes frequency model that is included in the matching model;
selecting a frequency model, which is performed at the next time point, from the frequency model list and generating the selected frequency model as a new expected notes frequency model;
generating a new matching model by combining the new passed notes frequency model, the new current notes frequency model, and the new expected notes frequency model; and
detecting a matching time for the new matching model based on tempo information with respect to the existing matching model.

8. The score tracking method of claim 7, wherein the adding a new matching model ends without adding a new matching model when the number of matching models that have not been matched since being generated exceeds a predetermined limit value.

* * * * *